(12) United States Patent
Derk et al.

(10) Patent No.: US 7,461,102 B2
(45) Date of Patent: Dec. 2, 2008

(54) METHOD FOR PERFORMING SCHEDULED BACKUPS OF A BACKUP NODE ASSOCIATED WITH A PLURALITY OF AGENT NODES

(75) Inventors: David George Derk, Gibsonia, PA (US); Robert Clair Edwards, Jr., Susquehanna, PA (US); Glen Hattrup, Tucson, AZ (US); Avishai Haim Hochberg, San Jose, CA (US); Thomas Franklin Ramke, Jr., Vonore, TN (US); James Patrick Smith, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 11/010,078

(22) Filed: Dec. 9, 2004

(65) Prior Publication Data
US 2006/0129615 A1    Jun. 15, 2006

(51) Int. Cl.
G06F 12/00 (2006.01)

(52) U.S. Cl. .................. 707/204; 707/10; 709/217; 711/161; 711/162

(58) Field of Classification Search .............. 707/1–10, 707/100–104.1, 200–206; 709/217–219, 709/223–226; 711/161–162; 714/1–2, 4–6, 714/11, 13, 15
See application file for complete search history.

(56) References Cited

U.S. PATENT DOCUMENTS

| | | | |
|---|---|---|---|
| 4,995,112 A | 2/1991 | Aoyama | |
| 5,414,845 A * | 5/1995 | Behm et al. | 718/104 |
| 5,553,239 A | 9/1996 | Heath et al. | |
| 5,819,020 A * | 10/1998 | Beeler, Jr. | 714/5 |
| 5,974,563 A * | 10/1999 | Beeler, Jr. | 714/5 |
| 6,256,740 B1 * | 7/2001 | Muller et al. | 726/12 |
| 6,345,287 B1 | 2/2002 | Fong et al. | |
| 6,389,543 B1 | 5/2002 | Dawson et al. | |
| 6,714,952 B2 * | 3/2004 | Dunham et al. | 707/204 |
| 6,751,729 B1 | 6/2004 | Giniger et al. | |
| 6,859,889 B2 * | 2/2005 | Matsuura et al. | 714/7 |
| 2001/0044879 A1 | 11/2001 | Moulton et al. | |

(Continued)

OTHER PUBLICATIONS

Peter Eitel, Backup and storage management in distributed heterogenerous environments, IEEE, 1994, 124-126.*

(Continued)

*Primary Examiner*—Jean B Fleurantin
(74) *Attorney, Agent, or Firm*—David W. Victor; Konrad Raynes & Victor LLP

(57) ABSTRACT

Provided is a method for performing scheduled backups of a backup node associated with a plurality of agent nodes. Backup data sets on at least one machine in a network are associated with a backup node and a plurality of agent nodes in the network are associated with the backup node. The agent nodes are associated with machines in the network capable of backing up the backup data sets associated with the backup node. A schedule indicating a scheduled backup to backup scheduled data sets associated with the backup node is processed. At least one of the agent nodes is contacted to request the at least one agent node to perform the scheduled backup and backup the scheduled data sets, wherein the at least one contacted agent node performs the scheduled backup to backup the scheduled backup sets.

9 Claims, 6 Drawing Sheets

U.S. PATENT DOCUMENTS

2002/0107877 A1* 8/2002 Whiting et al. ............. 707/204
2003/0126200 A1 7/2003 Wolff
2003/0135621 A1 7/2003 Romagnoli
2003/0177149 A1 9/2003 Coombs
2004/0019624 A1 1/2004 Sukegawa
2004/0039816 A1 2/2004 Bae et al.
2005/0165868 A1* 7/2005 Prakash ..................... 707/204

OTHER PUBLICATIONS

Nathan J. Muller, Improving network operations with intelligent agents, IEEE, vol. 7, 1997, 116-126.*
US Patent Application, filed Dec. 9, 2004, entitled "Authenticating a Node Requesting Another Node to Perform Work on Behalf of Yet Another Node", invented by Edwards, Jr., R.C., G. Hattrup, A.H. Hochberg, N.G. Rasmussen, and J.P. Smith.

* cited by examiner

Backup Node Information

Scheduled Backup

METHOD FOR PERFORMING SCHEDULED BACKUPS OF A BACKUP NODE ASSOCIATED WITH A PLURALITY OF AGENT NODES

BACKGROUND OF THE INVENTION

1. Field of the Invention

The present invention relates to a method, system, and program for performing scheduled backups of a backup node associated with a plurality of agent nodes.

2. Description of the Related Art

In a network backup environment, a client system may backup data in a storage device and coordinate the backup with a backup server. For instance, the International Business Machines ("IBM"®) Tivoli® Storage Manager product provides software for a client and server systems to backup client data. (IBM and Tivoli are registered trademarks of IBM).

In a backup environment of multiple client nodes, one client node may logon to the backup server to perform backup operations on behalf of another node having data sets to backup, which may be part of a scheduled backup. To schedule a backup operation, a backup operation may be scheduled for one node to backup data sets in an attached storage at that node or a set of backup operations may be defined and associated with nodes to perform the scheduled backup. In the second technique, a schedule is defined and nodes are associated with that schedule.

SUMMARY

Provided are a method, system, and program for performing scheduled backups of a backup node associated with a plurality of agent nodes. Backup data sets on at least one machine in a network are associated with a backup node and a plurality of agent nodes in the network are associated with the backup node. The agent nodes are associated with machines in the network capable of backing up the backup data sets associated with the backup node. A schedule indicating a scheduled backup to backup scheduled data sets associated with the backup node is processed. At least one of the agent nodes is contacted to request the at least one agent node to perform the scheduled backup and backup the scheduled data sets, wherein the at least one contacted agent node performs the scheduled backup to backup the scheduled backup sets.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
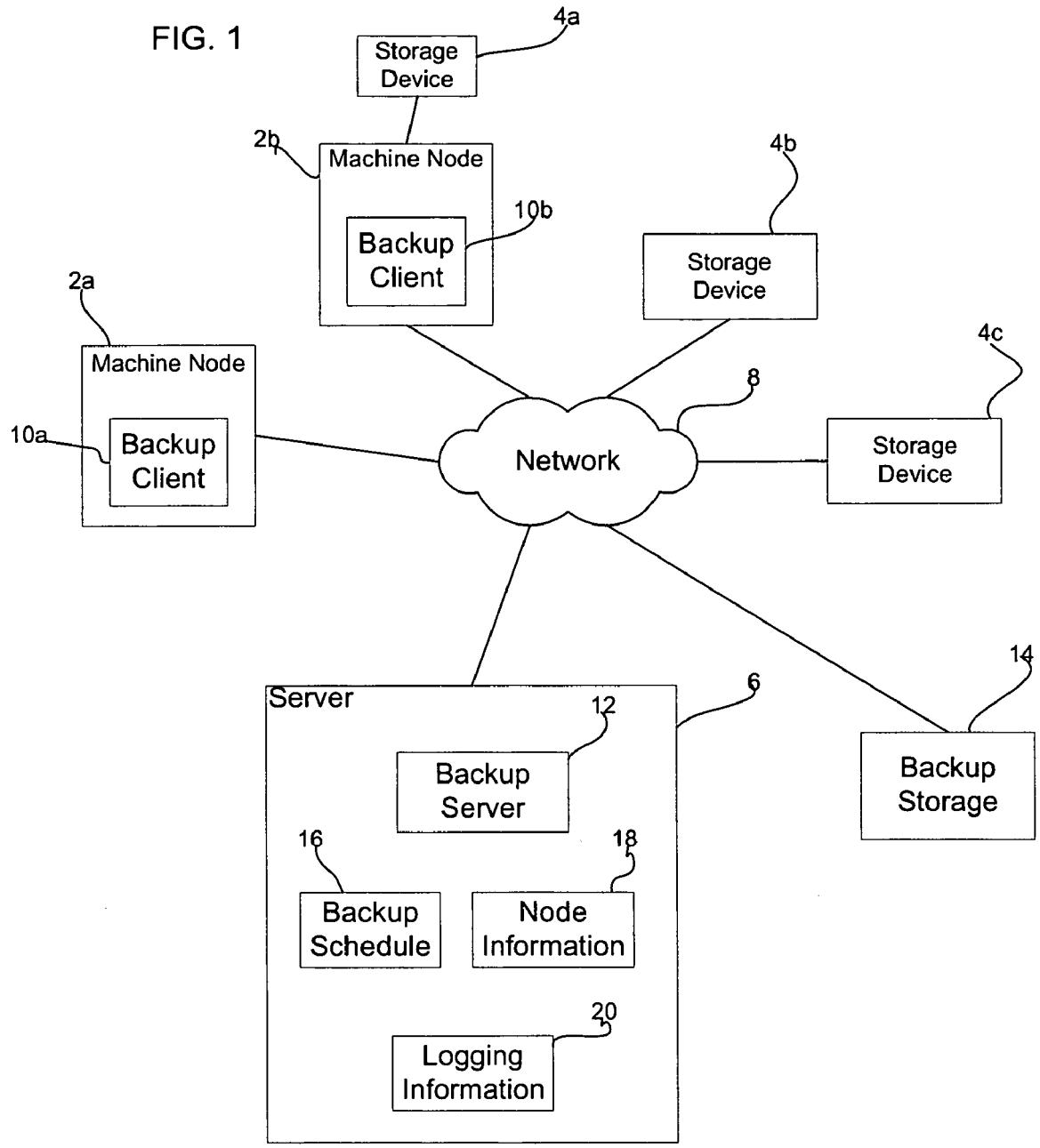
FIG. 1 illustrates an embodiment of a network computing environment.

FIG. 1 illustrates a network computing environment having a plurality of machine nodes 2a and 2b (two are shown, but there may be more), a plurality of storage devices 4a, 4b, 4c (three are shown, but there may be more), and a server 6 that communicate over a network 8. The machine nodes 2a, 2b include backup client 10a, 10b program and the server 6 includes a backup server 12 program to coordinate machine node 2a, 2b operations to backup data sets in the storage devices 4a, 4b, 4c to backup storage 14. The storage devices, e.g., 4a, may be coupled to machine nodes, 2b, and connect to the network 8 via the connected machine node 2b. The backup server 12 maintains a backup schedule 16 of backup operations to perform, node information 18 providing information on the network nodes involved in backup operations, and logging information 20 that the backup server 12 logs for backup operations.

To backup data, the machine nodes 2a, 2b may backup data from attached storage devices to the server 6, which then backups the data sets in backup storage 14. Alternatively, in a LAN free backup operation, the machine nodes 2a, 2b coordinate backup operations with the server 6 via a separate network, such as a Local Area Network (LAN), and then the machine nodes 2a, 2b directly backup data from the storage devices 4a, 4b, 4c over the network 8, which may comprise a Storage Area Network (SAN), to the backup storage 14. The backup storage 14 may be attached directly to the network 8, such as shown in FIG. 1, or be coupled to the server 6 and connect to the network 8 through the server 6.

The machine nodes 2a, 2b may comprise suitable computational devices known in the art, such as servers, desktop computers, workstations, mainframes, hand held computing devices, telephony devices, etc. capable of interfacing with a backup server 6. The storage devices 4a, 4b, 4c may comprise any suitable storage device known in the art, such as a storage system including a plurality of storage devices, e.g., interconnected hard disk drives (a Redundant Array of Independent Disks (RAID), Just a Bunch of Disks (JBOD), Direct Access Storage Device (DASD), disks connected in a loop configuration (serial loop, Fibre Channel Arbitrated Loop), a tape library, an optical library, a network attached storage (NAS), etc. Alternatively, the storage devices may comprise local storage, e.g., 4a, within or attached to a machine node, e.g., 2b. The storage devices 4a, 4b, 4c comprise network nodes having storage. The storage device nodes 4a, 4b, 4c may include a backup client program (not shown) that allows them to coordinate with the backup server 12 to transfer their data sets to the backup storage 14. The server 6 may comprise a suitable server system known in the art to manage backup messages from multiple systems. The backup storage 14 may comprise suitable non-volatile storage systems known in the art, such as tape storage, hard disk drives, optical storage, etc. The network 8 may comprise one or more networks known in the art, such as a Wide Area Network (WAN), Local Area Network (LAN), Storage Area Network (SAN), wireless network, the Internet, and Intranet, etc.

Figure 2:
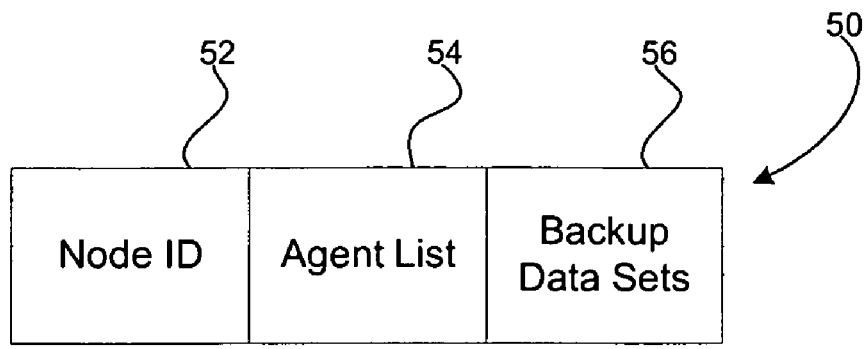
FIG. 2 illustrates an embodiment of backup node information.

FIG. 2 illustrates an embodiment of the node information 50 for a backup node, comprising: a backup node identifier (ID) 52; an agent list 54 that associates a plurality of agent nodes comprising machine nodes 2a, 2b in the network 8 with the backup node; and backup data sets 56. The identified agent nodes in the agent list 54 are assigned to backup the indicated backup data sets 56. The backup data sets 56 may include data sets in different storage devices 4a, 4b, 4c in the network 8, such that the backup data set 56 information identifies a location in the network 8 and a location in the storage device 4a, 4b, 4c of the data to backup. The agent list 54 may further indicate a status of the agent machine nodes 2a, 2b, such as whether they are available to participate in a backup of the backup data sets 56 for the node.

In one embodiment, a backup node 50 may comprise a virtual node in that there is no physical machine node 2a, 2b directly corresponding to the backup node 50. The machine nodes 2a, 2b indicated in the agent list 54 comprise the computational resources that correspond to the backup node 50 and that are designated to backup the backup sets 56 defined for the backup node 50. Further, the data sets for a virtual backup node may be distributed across multiple physical storage devices 4a, 4b, 4c. A virtual backup node 50 may be used to group data sets in distributed storage 4a, 4b, 4c that have common characteristics, such as a common backup policy, common source, common importance, etc. Alternatively, the backup node 50 may comprise a machine node, e.g., 2b having attached storage, e.g., 4b, and the agent nodes indicated in the agent list 54 comprise additional machine nodes 2a on the network 8 that are assigned to backup the backup data sets 56 of the backup node 50. In either case, when an agent node performs operations on behalf of the backup node, which may comprise a virtual or physical machine node, the agent node may act on behalf of the backup node so that the backup operations the agent node performs on behalf of the backup node are logged by the backup server 12 as performed by the backup node in the log information 20.

Figure 3:
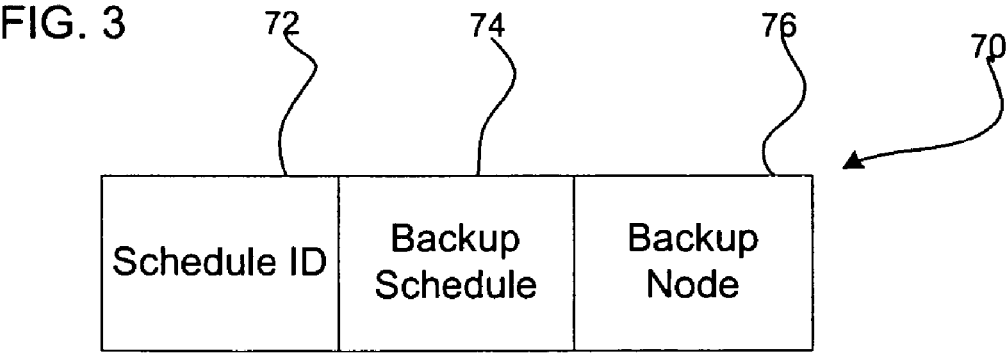
FIG. 3 illustrates an embodiment of a scheduled backup.

FIG. 3 illustrates an embodiment of a scheduled backup 70 that may be included in the backup schedule 16 the backup server 12 executes. A scheduled backup 70 includes a schedule identifier (ID) 72; a backup schedule 74 indicating backup day and/or times to perform the backup of the scheduled backup 70; and a backup node 76 to backup. The backup node 76 may represent a virtual node associated with multiple machine nodes 2a, 2b identified in the agent list 54.

Figure 4:
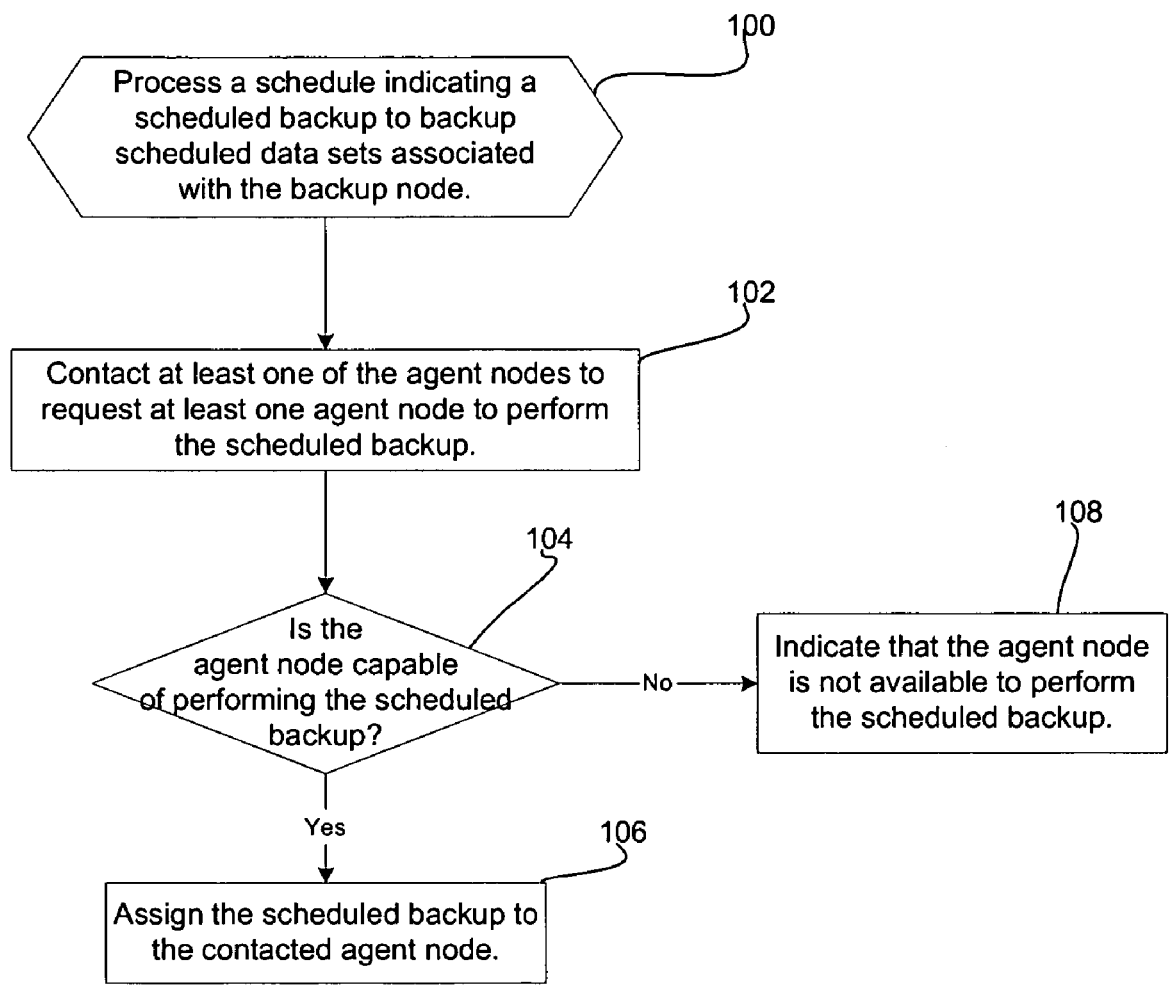
FIGS. 4, 5, 6, and 7 illustrate embodiments of operations to backup data sets in a scheduled backup.

FIG. 4 illustrates an embodiment of operations performed by the backup server 12 executed by the server 6 to process a scheduled backup 70. Upon initiating (at block 100) the processing of one scheduled backup 70 to backup the scheduled data sets 56 associated with the backup node 50, the backup server 12 contacts (at block 102) at least one of the agent nodes 2a, 2b indicated in the agent list 54 for the backup node 50 to request the at least one contacted agent node to perform the scheduled backup of the backup data sets 56 associated with the backup node. If (at block 104) the contacted agent node is capable of performing the scheduled backup 50, then the backup server 12 assigns (at block 106) the scheduled backup to the available contacted agent node. If (at block 104) the contacted agent node is not available, then the backup server 12 may indicate (at block 108) in the agent list 54 that the contacted agent node is not available to perform the scheduled backup 50. An agent node indicated in the agent list 54 as not available would not be contacted during a subsequent processing of the scheduled backup 50. An agent node may be unavailable if there is a device failure of the agent node or network failure to the agent node or the agent node does not have sufficient computational resources available to handle all or a portion of the scheduled backup, i.e., it is too busy. The backup server 12 may assign all or a portion of the backup data sets 56 to an available agent node 2a, 2b. For instance, the backup server 12 may automatically distribute the backup data sets 56 to multiple available agent nodes 2a, 2b to balance the workload. Alternatively, if the agent nodes 2a, 2b are contacted serially, then each agent node may be assigned as many of the backup data sets 56 that the contacted agent node can process given its current workload.

Figure 5:
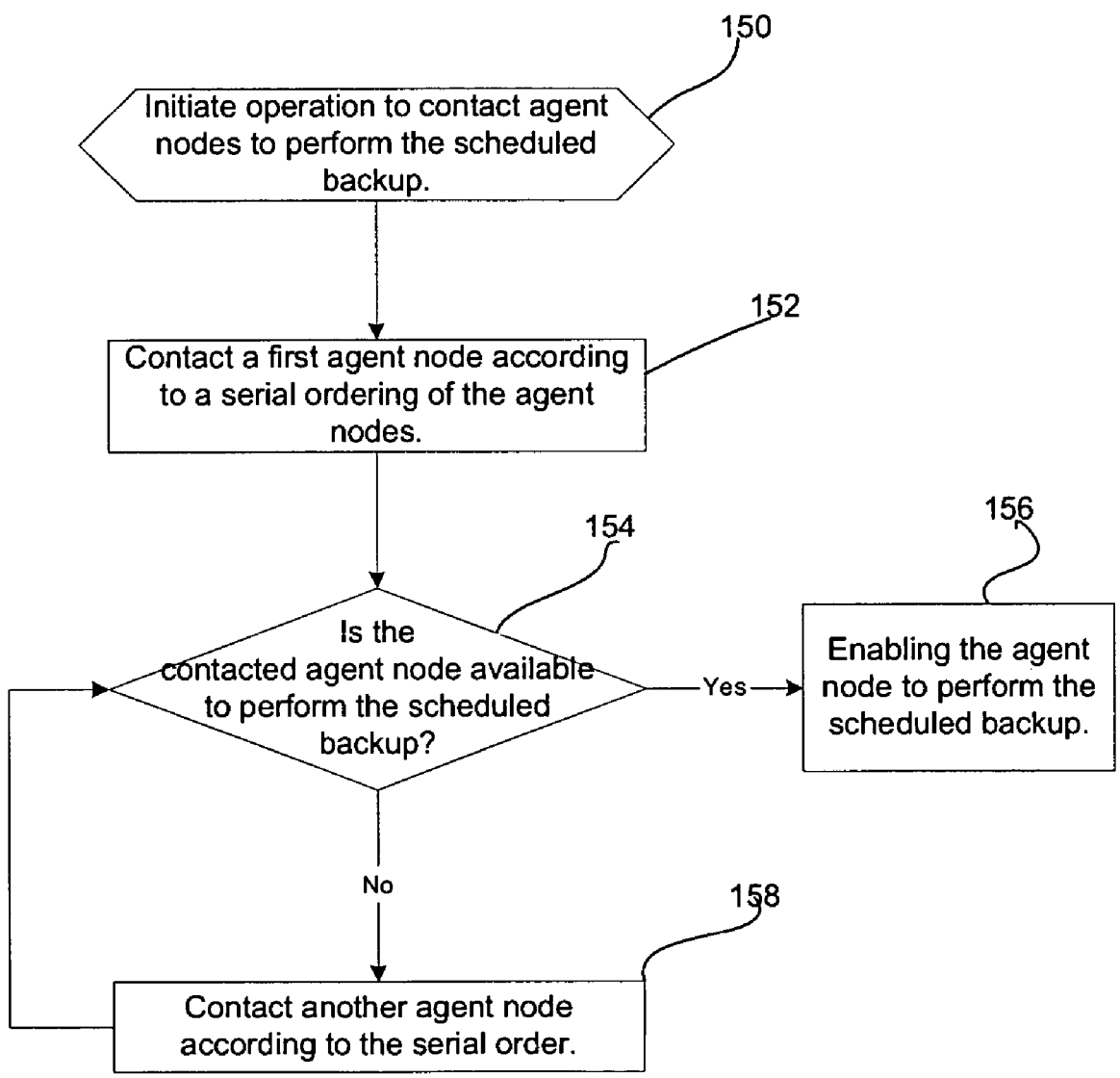

FIG. 5 illustrates an embodiment of operations performed by the backup server 12 to serially select agent nodes 2a, 2b in the agent list 54 to process the scheduled backup operation 70. Upon initiating (at block 150) an operation to contact agent nodes to perform the scheduled backup, which may comprise the operation at block 102 in FIG. 4, the backup server 12 contacts (at block 152) a first agent node according to a serial ordering of the agent nodes in the agent list 54. If (at block 154) the contacted agent node is available to perform the scheduled backup, then the backup server 12 enables (at block 156) the contacted agent node to perform the scheduled backup. Otherwise, if (at block 154) the contacted agent node is unavailable, i.e., the contacted agent node is too busy or there is a network or device failure causing the contacted agent node to be unavailable, then the backup server 12 contacts (at block 158) a next agent node according to the serial order indicated in the agent list 54. As discussed, the serially contacted agent nodes in the agent list 54 may perform a portion or all of the scheduled backup operation. In an alternative embodiment, nodes may be assigned portions of a file to backup. In such case, after block 156, the backup server 12 may continue to contact nodes to locate nodes to perform portions of the work to distribute the work among multiple nodes and allow for concurrent backup of the data.

Figure 6:
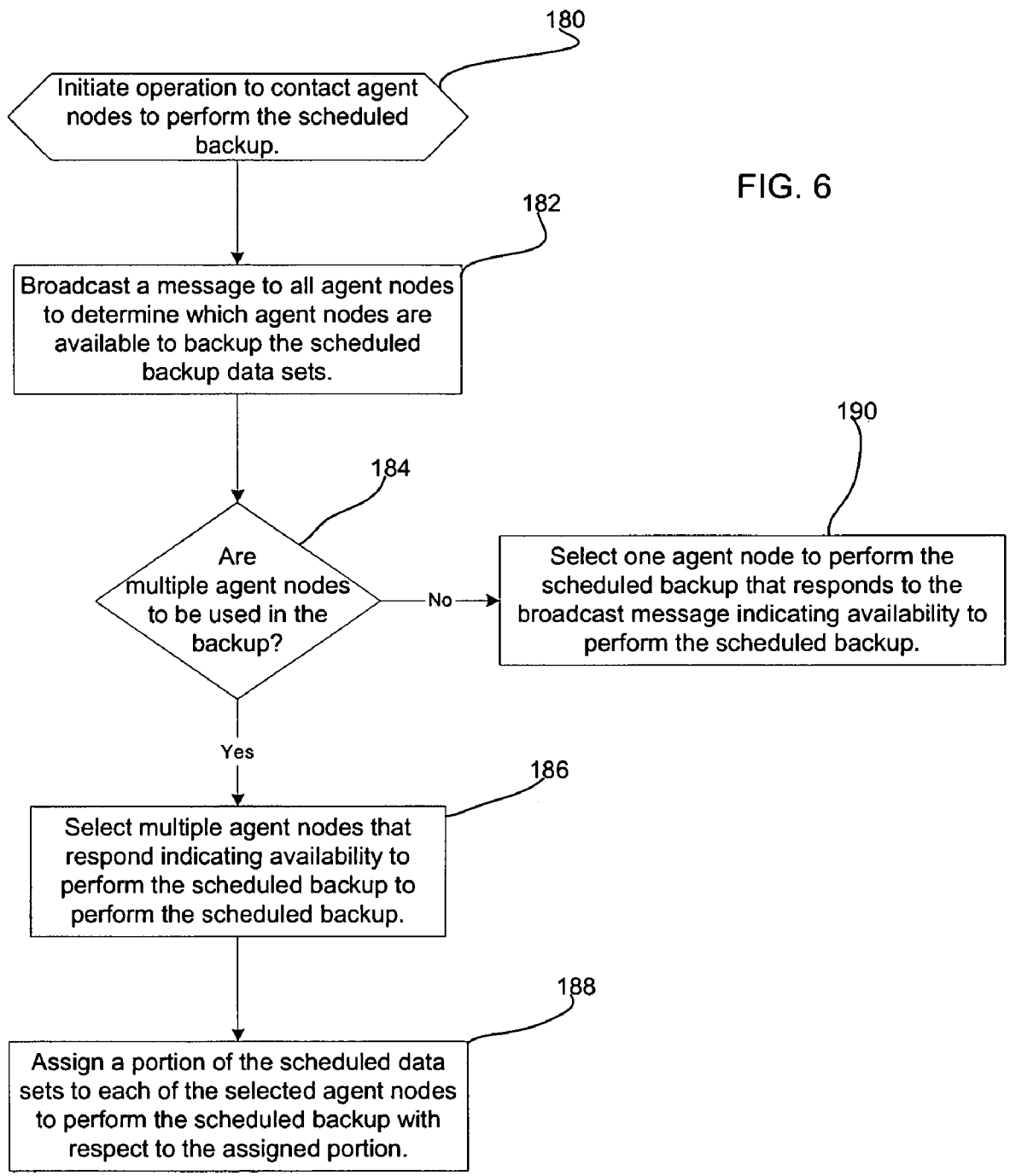

FIG. 6 illustrates an embodiment of operations performed by the backup server 12 to broadcast messages to all agent nodes 2a, 2b in the agent list 54 to process the backup operation. Upon initiating (at block 180) an operation to contact agent nodes to perform the scheduled backup, which may comprise the operation at block 102 in FIG. 4, the backup server 12 broadcasts (at block 182) a message to all agent nodes 2a, 2b indicated in the agent list 54 to determine which agent nodes are available to backup the scheduled backup data sets 56. If (at block 184) the backup server 12 prefers to use multiple agent nodes in the backup, then the backup server 12 selects (at block 186) multiple agent nodes 2a, 2b that respond indicating availability to perform the scheduled backup of the backup node's 74 backup data sets 56. The backup server 12 assigns (at block 188) a portion of the scheduled data sets to each of the selected agent nodes 2a, 2b to perform the scheduled backup with respect to the assigned portion. The backup server 12 may distribute the scheduled data sets 56 to balance the workload among the available agent nodes. If the backup server 12 prefers to use a single agent node, then the backup server 12 selects (at block 190) one agent node responding to the broadcast message indicating availability to perform the scheduled backup to perform the scheduled backup of the backup data sets 56.

In the embodiment of FIG. 6, if less than all the agent nodes to which the broadcast is directed respond, then those responding and available agents will be assigned backup data sets to backup. Thus, failure of some of the agents to respond is tolerated and those agents that are available are then used to handle the scheduled backup. A node may not be available if node client is down or if node responds indicating that it is too busy to assist with the scheduled backup.

Figure 7:
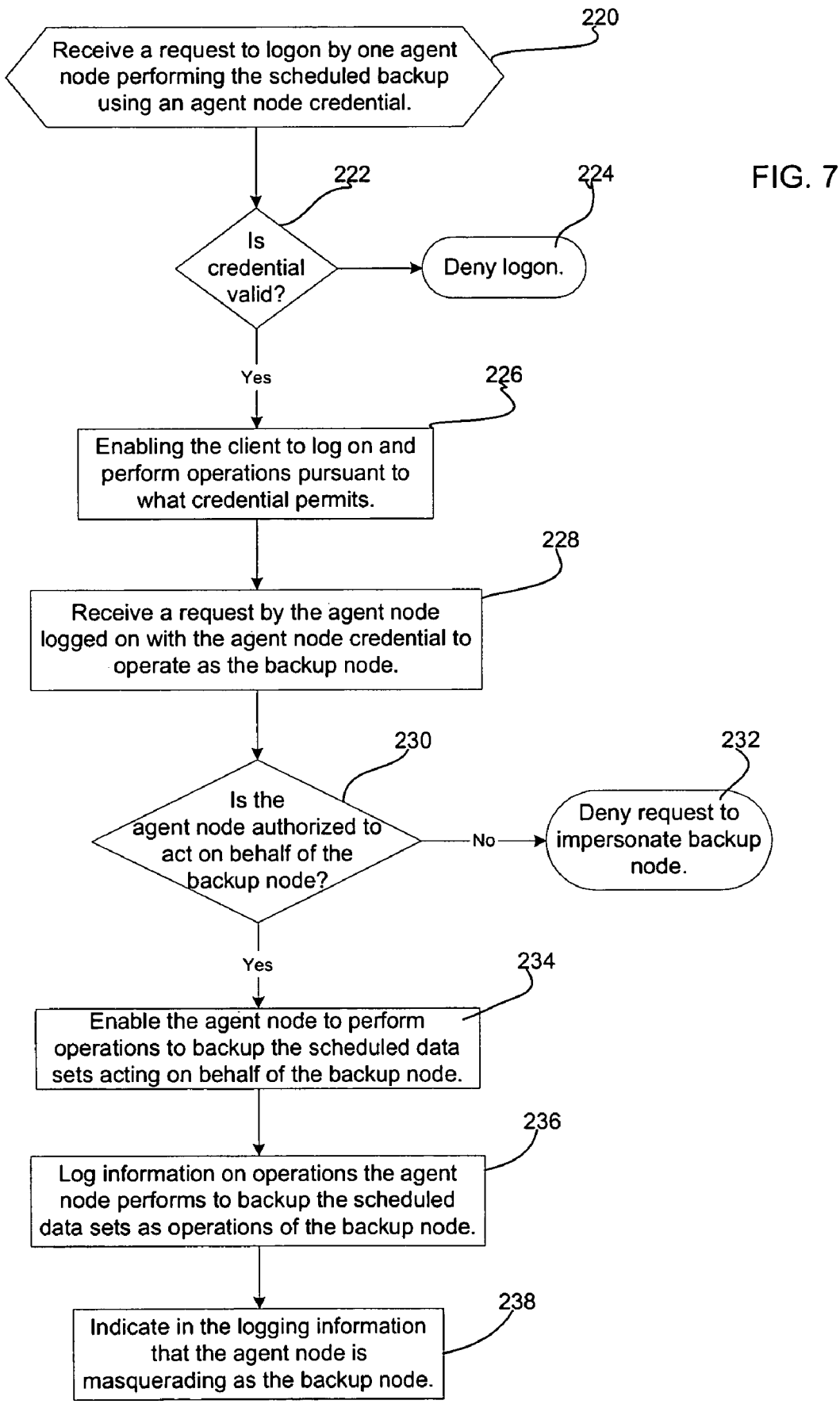

FIG. 7 illustrates authentication operations performed by the backup server 12 to log information about backup operations performed by one agent node 12 on behalf of the backup node 50 subject to the backup, where the backup node may comprise a virtual node. The agent nodes 2a, 2b upon being selected to perform backup operations would logon to the backup server 12 to initiate the backup operations on behalf of the backup node 50 subject to the scheduled backup. The agent node 2a, 2b may act on behalf of the backup node when performing the scheduled backup. Upon receiving (at block 220) a request to logon by one agent node performing the scheduled backup using an agent node credential, the backup server 12 determines (at block 222) whether the agent node credential is valid. If not, the backup server 12 denies (at block 224) the logon. Otherwise, if the credential is valid, the backup server 12 enables (at block 226) the client to logon and perform operations pursuant to what the valid credential permits. Upon receiving (at block 228) a request by the agent node logged on with the agent node credential to operate as the backup node, the backup server 12 determines (at block 230) whether the requesting agent node is authorized to act on behalf of the backup node. If not, then the backup server 12 denies (at block 232) the agent request to act on behalf of the backup node. Otherwise, if the authentication succeeds, then the backup server 12 enables (at block 234) the requesting agent node to perform operations to backup the scheduled data sets acting on behalf of the backup node. The backup server 12 logs (at block 236) information 20 on backup operations the agent node 2a, 2b performs to backup the scheduled data sets as operations of the backup node. Further, the backup server 12 may indicate (at block 238) in the logging information 20 that the agent node is operating as the backup node.

Described embodiments provide techniques to define a backup node in the network, where a plurality of machine nodes in the network may be designated as agent nodes to backup the backup sets assigned to the defined backup node. Any operations an agent node performs on behalf of the backup node may be logged as performed by the backup node, such that the agent node acts on behalf of the backup node.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The illustrated operations of FIGS. 4-7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    associating backup data sets on at least one machine in a network with a backup node;
    associating a plurality of agent nodes in the network with the backup node, wherein the agent nodes comprise machines in the network capable of backing up the backup data sets associated with the backup node;
    processing a schedule indicating a scheduled backup to backup scheduled data sets associated with the backup node;
    contacting at least one of the agent nodes associated with the backup node over the network to request the at least one agent node to perform the scheduled backup and backup the scheduled data sets, wherein the at least one contacted agent node performs the scheduled backup to backup the scheduled backup sets, and wherein the at least one agent node performing the scheduled backup acts on behalf of the backup node when performing the scheduled backup operations;
    receiving a request to logon by one agent node performing the scheduled backup using an agent node credential;
    receiving a request by the agent node logged on with the agent node credential to operate as the backup node, wherein the agent node performs operations to backup the scheduled data sets acting on behalf of the backup node;
    logging information on operations the agent node performs to backup the scheduled data sets as operations of the backup node.

2. The method of claim 1, wherein the backup node comprises a virtual node, and wherein at least one backup data set associated with the backup node is implemented within one node on the network that is different from at least one agent node associated with the backup node.

3. The method of claim 1, wherein the scheduled data sets are located on storage devices in the network, wherein the agent nodes backup the scheduled data sets by communicating with the storage devices over the network to cause a transfer of the scheduled data sets from the storage devices to backup storage.

4. The method of claim 1, wherein communicating with the at least one agent node comprises:
    contacting at least one agent node to determine whether the agent node is available to perform the scheduled backup; and
    assigning the scheduled backup to the contacted agent node in response to determining that the agent node is available to perform the scheduled backup.

5. The method of claim 4, wherein the agent nodes are contacted in a serial order, further comprising:

contacting another agent node according to the serial order to determine whether the agent node is capable of performing the scheduled backup in response to determining that a previously contacted agent node is not available to perform the backup.

6. The method of claim 4, wherein contacting the at least one agent node further comprises:

broadcasting a message to all agent nodes to determine which agent nodes are available to backup the scheduled backup data sets; and selecting at least one agent node to perform the scheduled backup that responds to the broadcast message indicating availability to perform the scheduled backup.

7. The method of claim 6, wherein selecting the at least one agent mode comprises:

selecting multiple agent nodes that respond indicating availability to perform the scheduled backup; and assigning a portion of the scheduled data sets to each of the selected agent nodes to perform the scheduled backup with respect to the assigned portion.

8. The method of claim 1, wherein the agent nodes backup the scheduled data sets to a backup storage device.

9. The method of claim 1, further comprising:

indicating in the logging information that the agent node is operating as the backup node.

* * * * *